United States Patent
Lewis

(10) Patent No.: US 9,429,250 B2
(45) Date of Patent: Aug. 30, 2016

(54) FLOAT DEVICE

(71) Applicant: Daniel Jay Lewis, Stratford, CT (US)

(72) Inventor: Daniel Jay Lewis, Stratford, CT (US)

( * ) Notice: Subject to any disclaimer, the term of this patent is extended or adjusted under 35 U.S.C. 154(b) by 642 days.

(21) Appl. No.: 13/732,919

(22) Filed: Jan. 2, 2013

(65) Prior Publication Data

US 2014/0017098 A1    Jan. 16, 2014

Related U.S. Application Data

(60) Provisional application No. 61/582,679, filed on Jan. 3, 2012.

(51) Int. Cl.
*F16L 3/00* (2006.01)
*F16L 1/24* (2006.01)
*A62C 33/04* (2006.01)

(52) U.S. Cl.
CPC .............. *F16L 3/003* (2013.01); *A62C 33/04* (2013.01); *F16L 1/24* (2013.01)

(58) Field of Classification Search
CPC .......... A62C 33/04; F16L 1/24; F16L 3/003; B63B 22/00
USPC ........... 141/114; 441/40, 41, 133; 210/242.1
See application file for complete search history.

(56) References Cited

U.S. PATENT DOCUMENTS

| | | | |
|---|---|---|---|
| 1,579,917 A | 4/1926 | Deming | |
| 1,621,413 A | 3/1927 | James | |
| 1,826,892 A * | 10/1931 | Landry | 169/70 |
| 2,597,728 A | 5/1952 | Hink | |
| 2,957,579 A | 10/1960 | McCombie | |
| 3,109,812 A | 11/1963 | McAulay et al. | |
| 3,724,662 A * | 4/1973 | Ortiz | 405/65 |
| 3,782,552 A | 1/1974 | Wendell | |
| 3,794,446 A | 2/1974 | Ost | |
| 3,992,735 A * | 11/1976 | McCarthy | 441/133 |
| 4,017,394 A | 4/1977 | Hensley | |
| 4,024,063 A | 5/1977 | Mori | |
| 4,179,379 A * | 12/1979 | Mitchell | 210/242.1 |
| 4,190,086 A * | 2/1980 | Bormioli | 138/89 |
| 4,310,423 A * | 1/1982 | Brown et al. | 210/791 |
| 4,498,605 A | 2/1985 | Mackal | |
| 4,538,658 A | 9/1985 | Earley | |
| 4,631,039 A * | 12/1986 | Meriwether | 441/133 |
| 4,645,465 A * | 2/1987 | Courtney | 441/40 |
| 4,647,374 A | 3/1987 | Ziaylek et al. | |
| 4,797,063 A | 1/1989 | Lott | |
| 4,973,405 A * | 11/1990 | Kozey | 210/238 |
| 5,052,855 A | 10/1991 | Chapman et al. | |
| 5,113,889 A * | 5/1992 | McGuire, Jr. | E02B 9/04 137/135 |
| 5,349,984 A | 9/1994 | Weinheimer et al. | |
| 5,820,751 A | 10/1998 | Faircloth, Jr. | |
| 6,076,994 A * | 6/2000 | Brockway | E03B 3/04 210/122 |
| 6,080,027 A * | 6/2000 | Rodemann | 441/41 |
| 6,251,266 B1 | 6/2001 | Gannon et al. | |
| 6,299,132 B1 | 10/2001 | Weinheimer et al. | |

(Continued)

*Primary Examiner* — Timothy L Maust
(74) *Attorney, Agent, or Firm* — Cantor Colburn LLP

(57) ABSTRACT

A float device for use in a body of water includes a float configured to transform between a deflated state and an inflated state. The float includes at least one internal chamber. The float includes a manual inflation value configured to provide a passageway for adding gas to the at least one internal chamber and a deflation valve configured to provide a passageway for releasing gas from the at least one internal chamber. A float attachment member is attached to the float, such that when the float is placed in the body of water, the float attachment member is underwater.

20 Claims, 5 Drawing Sheets

(56) References Cited

U.S. PATENT DOCUMENTS

| | | |
|---|---|---|
| 6,361,691 B1 | 3/2002 | Dockery et al. |
| 6,460,560 B1 | 10/2002 | Weinheimer et al. |
| 6,949,198 B2 | 9/2005 | Reber |
| 7,021,326 B2 | 4/2006 | Rogier |
| 7,222,638 B1 | 5/2007 | Wong et al. |
| 7,296,782 B2 | 11/2007 | Enerson et al. |
| 7,501,058 B1 | 3/2009 | Lawrence, Sr. |
| 7,575,677 B1 | 8/2009 | Barnes |
| 7,641,174 B2 | 1/2010 | Enerson et al. |
| 7,794,589 B2 | 9/2010 | Kozey |
| 7,892,438 B2 | 2/2011 | Nielsen |
| 2004/0164031 A1 | 8/2004 | Reber |
| 2010/0059432 A1 | 3/2010 | Kozey |
| 2010/0216360 A1* | 8/2010 | Kato ............................ 441/133 |
| 2011/0042323 A1 | 2/2011 | Sullivan, II |
| 2014/0199124 A1* | 7/2014 | Rosche ...................... 405/224.3 |

* cited by examiner

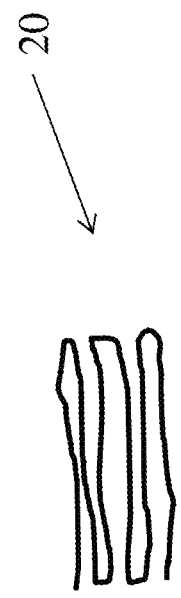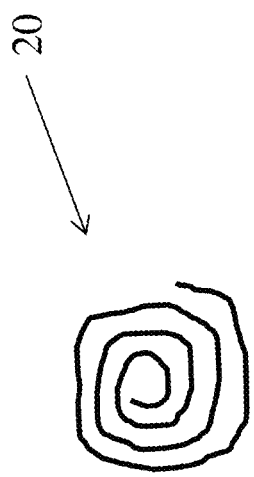

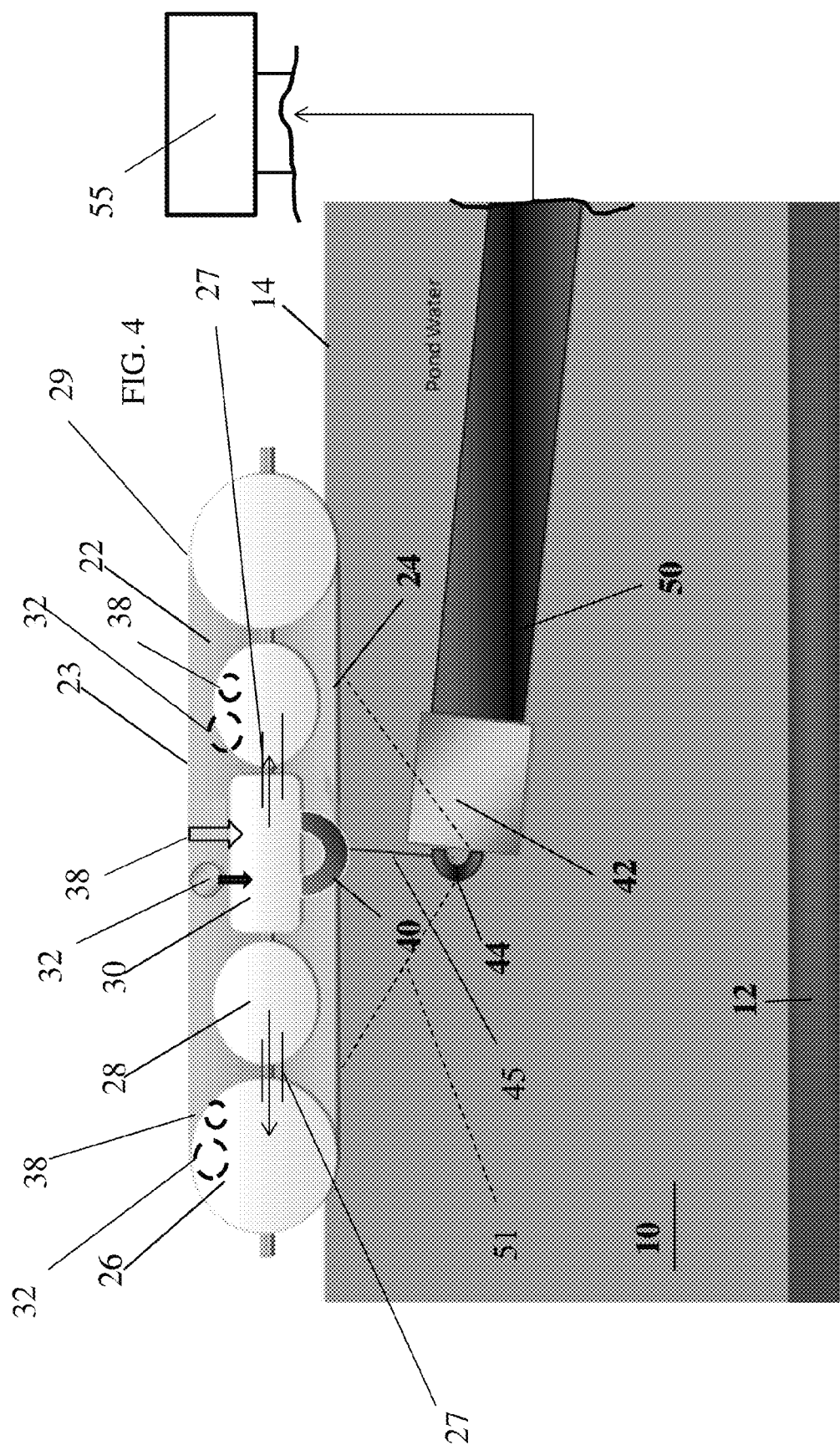

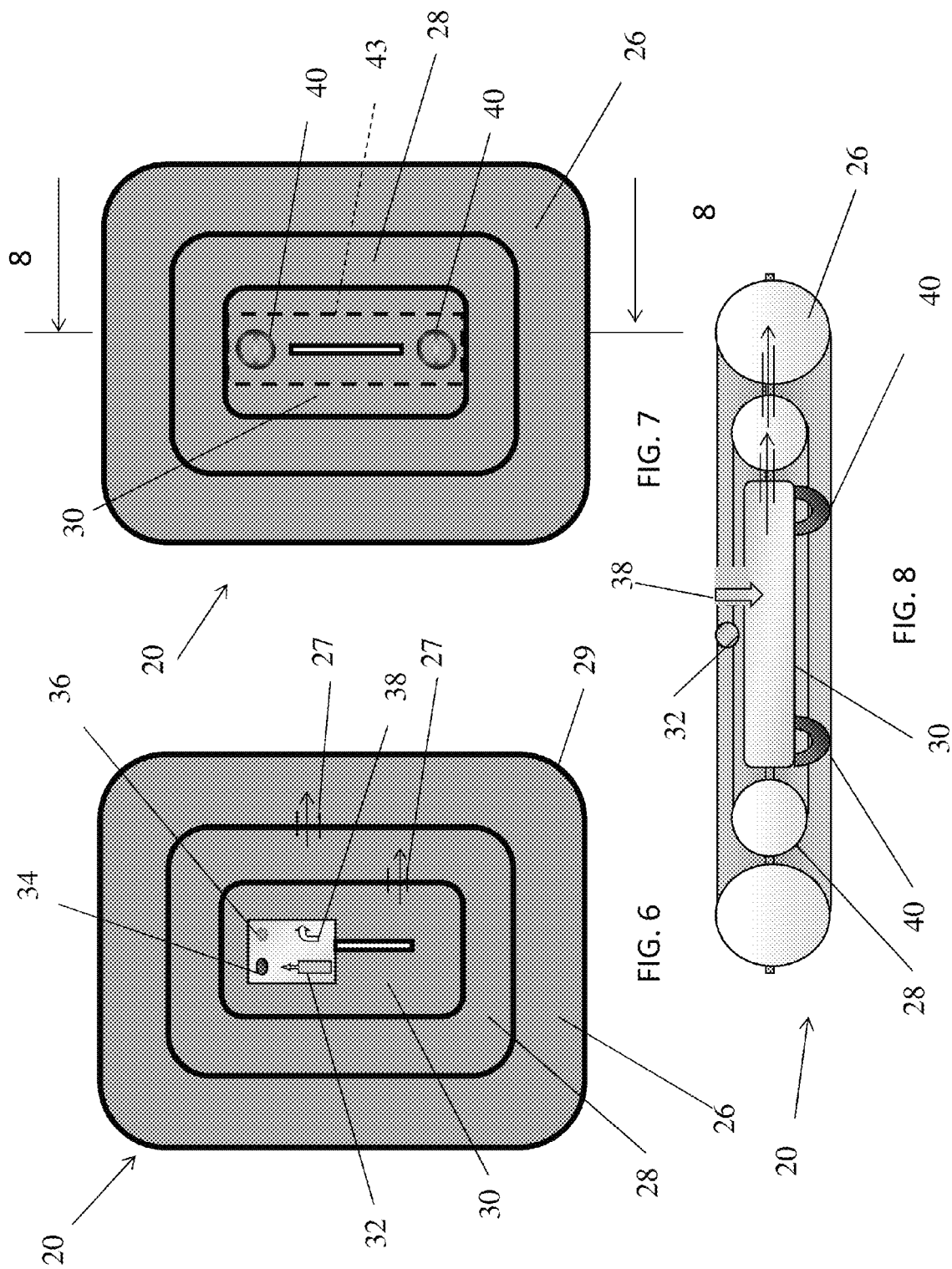

FLOAT DEVICE

CROSS REFERENCE TO RELATED APPLICATIONS

This application claims priority to U.S. Patent Application No. 61/582,679 filed on Jan. 3, 2012, the entire contents of which is incorporated herein by reference.

TECHNICAL FIELD

This invention relates generally to a float, more particularly, to a float attachment for supporting an end of a hose in a body of water.

BACKGROUND

Firefighters occasionally rely on open bodies of water, such as a pond, lake, or stream for example, as a water source in an emergency situation. A hose is placed into the water source and an adjacent pump connected thereto draws water through the attached hose. During operation, debris such as leaves and twigs can interfere with the functionality of the pump thereby causing problems with the delivery of the water. Floating devices designed for use with a firefighting hose are known and have been used by firefighters for decades. However, such assemblies are considerable in size and weigh up to approximately 50 pounds. Space on a firefighting vehicle is very limited; consequently many of these float assemblies have been removed such that when an open body of water must be used as a water source, the problem of the hose clogging from debris reoccurs.

Therefore, there is a need for a floating device that is lightweight and requires a limited amount of space on a firefighting vehicle when not in use. Also, it is desirable to provide such a float that is quickly and easily inflatable.

SUMMARY OF THE INVENTION

In accordance with an exemplary embodiment of the invention, a float device for use in a body of water includes a float configured to transform between a deflated state and an inflated state. The float includes at least one internal chamber. The float includes a manual inflation value configured to provide a passageway for adding gas to the at least one internal chamber and a deflation valve configured to provide a passageway for releasing gas from the at least one internal chamber. A float attachment member is attached to the float, such that when the float is placed in the body of water, the float attachment member is submerged.

According to another embodiment of the invention, a system for pumping water from a body of water is provided including a float device for use in a body of water includes a float configured to transform between a deflated state and an inflated state. The float includes at least one internal chamber. The float includes a manual inflation value configured to provide a passageway for adding gas to the at least one internal chamber and a deflation valve configured to provide a passageway for releasing gas from the at least one internal chamber. A float attachment member is attached to the float, such that when the float is placed in the body of water, the float attachment member is submerged. A hose attachment member fixed to a first end of a hose is coupled to the float attachment member such that the first end of the hose is supported by the float. A pump means connected to the second end of the hose draws water through the hose.

According to yet another embodiment of the present invention, a method of pumping water from an open body of water is provided, the method comprising the steps of inflating a float. A strainer and a hose attachment member are attached to a first end of a hose. The first end of the hose is connected to the float. The inflated float is placed in the body of water so that the first end of the hose is submerged in the water. Water is then pumped through the hose.

In yet another embodiment, a float assembly for supporting an inlet end of a hose in a body of water is provided, the float including: a float configured to transform between a un-inflated configuration, wherein the float has a first dimension and an inflated configuration, wherein the float has a second dimension, the second dimension being greater than the first dimension; at least one internal inflatable chamber located within the float; a mechanism for quickly inflating the float into the inflated state, wherein the mechanism is configured to fluidly couple a source of compressed gas to the at least one internal chamber; a manual inflation valve accessible from an exterior of the float and being configured to provide a fluid passageway to the at least one internal chamber; and an attachment member secured to the float, wherein the inflated configuration is sized to prevent a vortex from drawing air into the inlet end of the hose when it is supported in the body of water by the float.

In yet another embodiment, a system for pumping water from a body of water is provided, the system having: a float configured to transform between a un-inflated configuration, wherein the float has a first dimension and an inflated configuration, wherein the float has a second dimension, the second dimension being greater than the first dimension; at least one internal inflatable chamber located within the float; a mechanism for quickly inflating the float into the inflated state, wherein the mechanism is configured to fluidly couple a source of compressed gas to the at least one internal chamber; a manual inflation valve accessible from an exterior of the float and being configured to provide a fluid passageway to the at least one internal chamber; and an attachment member secured to the float, wherein the inflated configuration is sized to prevent a vortex from drawing air into the inlet end of the hose when it is supported in the body of water by the float; a hose attachment member fixed to a first end of a hose and configured to be releasably secured to the float attachment member such that the float device supports the first end of the hose; and a pump means connected to a second end of the hose for drawing water through the hose.

In yet another embodiment, a method for quickly inflating a float from an un-inflated state to an inflated state and for locating an inlet end of a hose below a surface of a body of water and for preventing a vortex from forming between the surface of the body of water and the inlet end of the hose is provided, the method including the steps of: releasing an amount of pressurized gas from a reservoir secured to the float by actuating a quick fill mechanism fluidly coupled to the reservoir and at least one internal chamber of the float, wherein the amount of pressurized gas inflates the at least one chamber to inflate the float from the un-inflated state to the inflated state, wherein the un-inflated state has a first dimension and the inflated state has a second dimension, the second dimension being greater than the first dimension; locating the inflated float in the body of water; and attaching the inlet end of the hose to an attachment member of the float located below the surface of the body water, wherein second dimension is greater than a dimension of the vortex, wherein the float further comprises a manual inflation valve accessible from an exterior of the float and being configured to provide a fluid passageway to the at least one internal chamber.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which:

FIGS. 1A-1C illustrate the float assembly in an un-inflated or deflated configuration;

FIG. 4 is a cross sectional view of the float assembly in an inflated state in a body of water;

FIGS. 6-8 illustrate a float assembly in accordance with an alternative exemplary embodiment.

DETAILED DESCRIPTION

Figure 1:
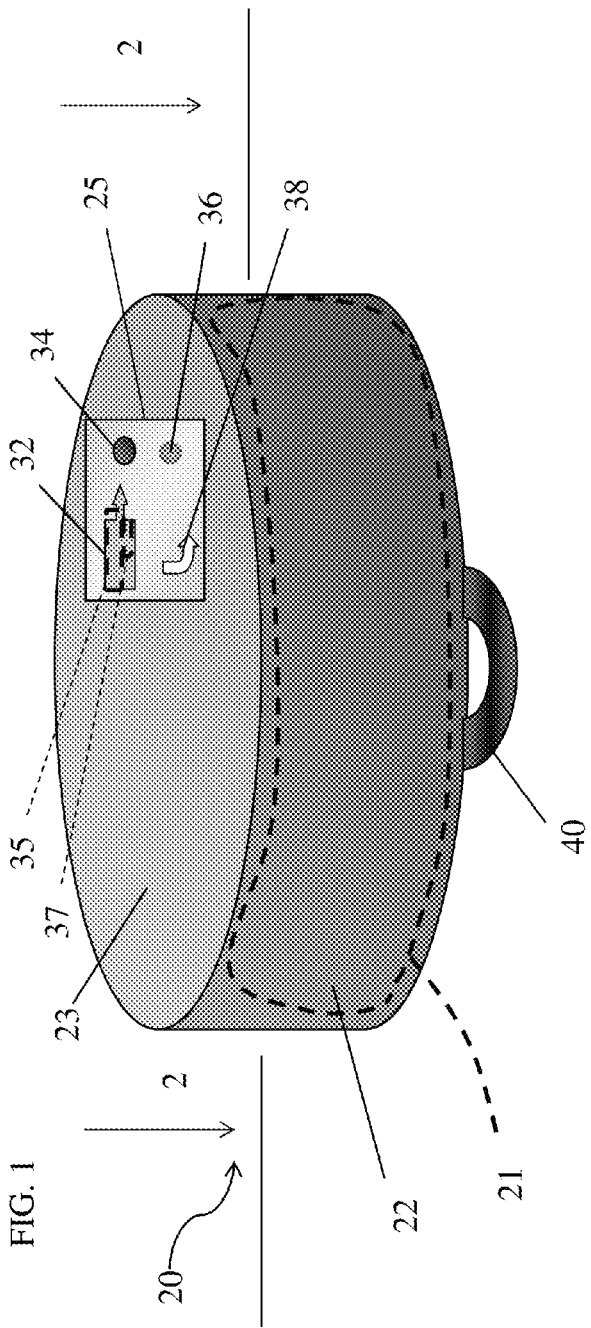
FIG. 1 is a perspective view of the float assembly in an inflated state in accordance with one non-limiting embodiment.
Figure 3:
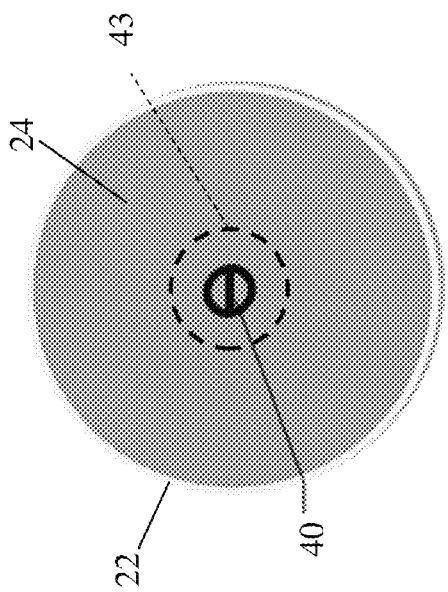
FIG. 3 is a bottom view of the float assembly.

Reference is made to the following U.S. Pat. Nos. 1,579, 917; 1,621,413; 2,597,728; 2,957,579; 3,109,812; 3,782, 552; 3,794,446; 4,017,394; 4,024,063; 4,179,379; 4,310, 423; 4,647,374; 4,797,063; 4,973,405; 5,052,855; 5,113, 889; 5,820,751; 6,076,994; 6,251,266; 6,361,691; 6,949, 198; 7,222,638; 7,501,058; 7,575,677; 7,794,589; 7,892, 438; and U.S. Patent Application Nos: U.S. 20040164031A1; U.S. 20100059432A1; and U.S. 20110042323A1, the contents each of which are incorporated herein by reference thereto.

A float assembly is disclosed herein. The float assembly is capable of being quickly deployed from an un-inflated state to an inflated state, wherein the size of the assembly increases and is configured to support an end of a hose in a body of water in a manner wherein the hose is prevented from resting on the bottom of the body of water and the float assembly prevents a vortex from drawing air into the hose. The float is also lightweight and easily managed by a single person whether it is in the inflated or deflated state.

Referring now to FIGS. 1-4, a floating device or float assembly 20 is illustrated. Floating device or assembly 20 includes an inflatable float 22 having at least one internal inflatable chamber 21. The float 22 is configured to transform between a deflated state (FIGS. 1A-1C), when it is being stored, and an inflated state (FIGS. 1, 2 and 3), when it is in use by filling the at least one internal inflatable chamber with a gas, such as air for example. The deflated state has a first configuration or dimension and the inflated state has a second configuration or dimension, wherein the second configuration or dimension is larger than the first configuration or dimension.

In the inflated state, the float 22 is buoyant in a body of water. When placed in a body of water, a top surface 23 of the float 22 is above the surface of the body of water, and a bottom surface 24 of the float 22 is adjacent to, or slightly below, the surface of the body of water. A float attachment device 40, such as an eyelet for example, is mounted to the bottom surface 24 of the float 22 and is configured to support an end of a hose below the surface of the body of water. In one non-limiting alternative embodiment, the float attachment device is attached to a reinforcement layer 43 secured to the bottom surface 24 (e.g., outer layer 29 or outer layers of the inflatable chambers) of the float 22. Reinforcement layer 43 may comprise an additional layer of material that may be the same as that of the rest of the float (e.g., vinyl fabric, polyurethane coated nylon fabric, rubbers, elastomers, canvas, etc. and equivalents thereof or alternatively may comprise a more rigid material) to provide additional strength to the area proximate to the attachment device 40.

Figure 2:
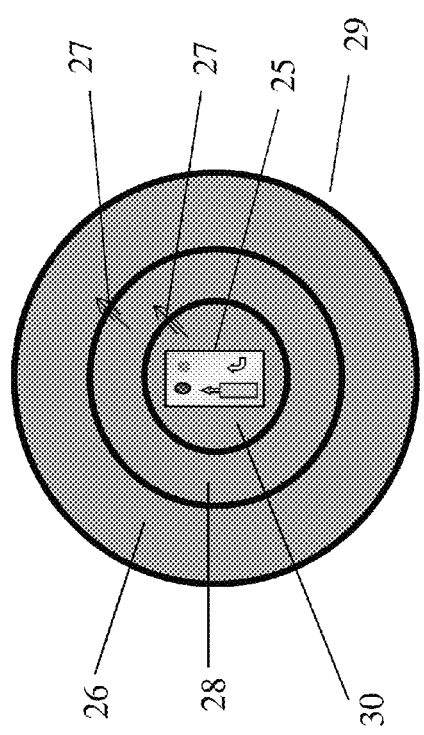
FIG. 2 is a view along lines 2-2 of FIG. 1 according to an exemplary embodiment of the invention.

In one, non-limiting exemplary embodiment, the at least one internal chamber may comprise a plurality of internal chambers, such as concentric outer chamber 26, middle chamber 28, and inner chamber 30 as illustrated in FIGS. 2 and 4, for example. Adjacent internal chambers of the float 22 may be fluidly coupled to each other through the use of openings or alternatively one way valves 27 (e.g., valves that are configured to only allow fluid flow in one direction) such that the gas being used to inflate the device 20 will flow between the plurality of internal chambers. One non-limiting example of one way valves 27 are those commercially available from Halkey-Roberts Corporation. Non-limiting examples contemplated one-way valves are illustrated in the following U.S. Pat. Nos. 7,641,174; 7,296,782; 6,460,560; 6,299,132; and 5,349,984 the contents each of which are incorporated herein by reference thereto. Still further and in one embodiment, the chambers themselves may define the outer periphery of the float or an outer skin layer 29 can be disposed over all of the chambers to define the float. In other words, outer skin layer 29 will define the exterior of the float and the chambers will be located therein. In one implementation, the outer skin layer 29 provides a protective cover for the float and is also configured to transition from the deflated state to the inflated state as the float is inflated. In addition and in some embodiments, the outer skin layer 29 contacts the water and prevents formation of the vortex.

In an alternate embodiment, each internal chamber may be inflated separately with its own inflation mechanism and there are no openings or one way valves as each chamber is sealed from each other.

In one embodiment, the float 22 is made from a flexible material such that when the float 22 is in a deflated state, the overall size of the float 22 is reduced, such as by folding or rolling for example (See at least FIGS. 1A, 1B and 1C). Additionally and due to the floatation device being an inflatable item, the weight of the floating device 20 is reasonable for a single person to easily maneuver regardless of whether the float 22 is inflated or deflated. In one embodiment, the float 22 may be made of a vinyl fabric for improved durability and buoyancy. Of course, other equivalent materials may be employed non-limiting examples include polyurethane coated nylon fabric, rubbers, elastomers, canvas, etc. and equivalents thereof.

The float includes at least one valve for inflating and deflating the float 22. In an exemplary embodiment, a manual inflation valve 38 is connected to an internal chamber of the float 22 and provides a pathway for a gas to enter the internal chamber. This manual inflation valve 38 may be similar to a valve used in standard tire application. (See at least FIG. 5) and is sealed to the material that defines the at least one inflatable chamber while also providing a fluid path into the internal inflatable chamber. In one embodiment, the float device 20 additionally includes an automatic inflation valve or mechanism 32, which may be in addition to or as an alternative to manual inflation valve 38. In one embodiment, these valves are located on the top surface 23 of the float 22 and also provides a fluid path into the internal chamber while the periphery of the valve is sealed to the material defining the chamber. Moreover and in one non-limiting embodiment, the valves and inflation mechanisms may referred to as an inflation system platform 25 wherein the valves and inflation mechanisms are located. This will allow for ease of access when inflating. In one embodiment, the inflation system platform may comprise an additional layer of material that may be the same as that of the rest of the float (e.g., vinyl fabric, polyurethane coated nylon fabric, rubbers, elastomers, canvas, etc. and equivalents thereof or alternatively may comprise a more rigid material) to provide additional strength to the area proximate to the valves. Various embodiments, contemplate the additional layer of material of the inflation system platform to be secured to outer layer 29 and/or directly to anyone or any combination of the inflatable chambers. Of course, any other suitable location (bottom, side, etc.) may be employed. Similar to the manual inflation valve 38, the automatic inflation valve or mechanism 32 also provides a passageway or means for gas to enter into the internal chamber(s) of the float 22.

In one embodiment, the automatic inflation valve or mechanism 32 employs a replaceable automatic fill system, wherein a replaceable and/or refillable container 35 of the mechanism contains a reservoir of compressed gas such as a carbon dioxide or any other gas and the container is fluidly coupled to the valve 32 such that upon actuation of an actuation mechanism 37 the reservoir of the container becomes fluidly coupled to the valve 32 such that the float 22 can be quickly inflated through actuation of mechanism 37. In other words, once mechanism 37 is activated, the compressed gas of the container 35 is released and the float assembly is inflated. One non-limiting type of inflation mechanism is the type commercially available from Halkey-Roberts Corporation. One non-limiting example is the V86160 Pro 3F Inflator available from Halkey-Roberts Corporation. One device or mechanism is also illustrated in, U.S. Pat. No. 4,498,605, the entire contents of which are incorporated herein by reference thereto. Of course, any other equivalent means for quick inflation may be employed.

Accordingly and through the use of mechanism 37, the container of the compressed gas is capable of rapidly inflating the float 22. Use of the automatic fill system coupled to automatic inflation valve 32 to inflate the float 22 is more efficient than using the manual valve 38. For example, the manual inflation valve 38 may be generally intended for use when the automatic fill system has been previously used and the replaceable and/or refillable container 35 needs to be replaced or refilled or has malfunctioned.

Figure 5:
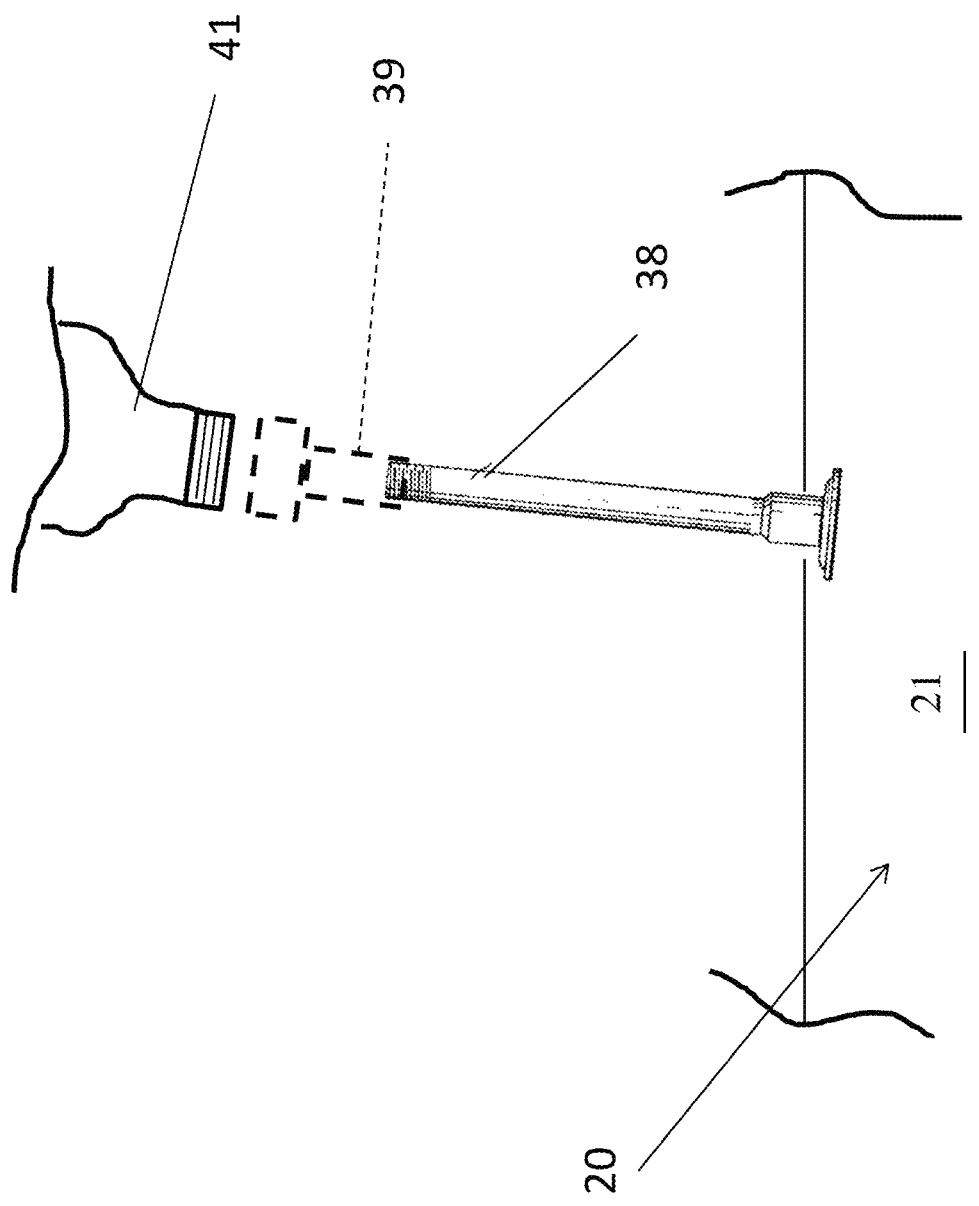
FIG. 5 is view illustrating a manual valve for inflating the float assembly.

In an alternative embodiment and as illustrated in at least FIG. 5, an adapter 39 may be used with the manual valve 38. In this embodiment, the adapter 39 will be configured to be threaded onto valve 38 as well as a larger pressurized container of air 41 such as a self contained breathing apparatus (SCBA) which is readily available to a fire fighter. Accordingly and in this embodiment, the SCBA tank 41 can be fluidly coupled to the valve 38 through adapter 39 in order to inflate the float assembly. In one embodiment, the adapter may be formed from any easily molded material such as plastic or other non-plastic metal materials may be employed. In other words, the adapter is configured to fluidly couple a larger diameter orifice (SCBA tank) to a smaller orifice (valve stem). Alternatively, the adapter is configured to couple a smaller orifice (SCBA tank or other reservoir) to a smaller orifice (valve stem). One non-limiting example of a manual valve is illustrated in U.S. Pat. No. 4,538,658, the contents of which are incorporated herein by reference thereto.

In one embodiment, the float device 20 is also equipped with a deflation valve 36, which may be located adjacent to the top surface 23 of float 22 or in any other suitable location. Suitable deflation valves are also commercially available from Halkey-Roberts Corporation. In one embodiment, the deflation valve 36 and the manual inflation valve 38 may be the same valve such that gases can be introduced and released from the float in order to allow inflation and deflation of the same. By opening the deflation valve 36, the gas within the internal chambers is released to the external atmosphere and the float assembly may be returned to the un-inflated state. In one non-limiting embodiment, the deflation valve may simply be a cap, cover or screw that is removed from an opening so that the inflatable chamber may be deflated.

In one embodiment, the float device 20 may additionally include an over pressure valve 34. In instances where the float 22 becomes over inflated or where the automatic inflation system accidentally inflates the float 22 while stored in a folded configuration and in a location that does not allow for the folded float to expand during accidental inflation, the over pressure valve 34 will release some of the gas from the internal chambers to prevent damage to the float device 20. Non-limiting examples of over pressure valves are also commercially available from Halkey-Roberts Corporation. In one alternative, embodiment the over pressure valve may be combined with anyone of, the manual, deflation or automatic inflation valve. An example of a combined inflation and relief valve is described in U.S. Pat. No. 7,021,326, the contents of which are incorporated herein by reference thereto. In one non-limiting exemplary embodiment all of the contemplated valves are located on the inflation system platform 25.

Referring now to FIG. 4, the float device 20 is shown in an inflated state in a body of water 10 wherein a hose 50 is coupled to the float. In one non-limiting embodiment, hose 50 is the type used in fire trucks and accordingly may add significant weight pulling downwardly on the float when it is in the water and the hose is attached to the float. For example, an empty fifty foot section of a 2½ inch fire hose weighs approximately 30-35 pounds. Thus and in one embodiment, the float must be configured to keep an inlet end of a fire hose above the bottom of the body of water and in some instances slightly below the surface of the water while also keeping the bottom surface of the float in contact with the surface of the water in order to prevent a vortex from forming between the inlet end of the hose and the surface of the body of water. When the float 22 is inflated, the float device 20 is placed in the body of water and will float on the surface 14 of the water such that the bottom surface 24 and the float attachment member 40 are in the body of water 10. Attached to a first end of the hose 50 is a strainer 42 that prevent debris, such as leaves and dirt for example, from entering the hose 50 as water is drawn in. Attached to the second end of the hose 50 is a pump mechanism 55 (located on the shore) for drawing water through the hose 50. As mentioned above, the pump mechanism is used to draw water from the body of water into another reservoir or device such as a fire truck. Accordingly, pump mechanism may draw a large amount of fluid into hose 50 and as mentioned above it is desirable to prevent the formation of a vortex to the surface. In one non-limiting embodiment, the pump mechanism is located on or within the fire truck. A hose attachment member 44 may be connected to the strainer 42 or, in instances where no strainer is present, directly to the hose 50. The hose attachment member 44 couples to the float attachment member 40 such that the first end of hose 50 is supported near the surface of the body of water 10 by the float attachment member 40. This engagement between the float attachment member 40 and the hose attachment member 44 prevents the end of hose 50 from resting on the bottom 12 of the body of water 10. Depending on the type of attachment members used, the hose 50 may be fixed or rotatably connected to the float 22. In one embodiment, the hose and float attachment members 44, 40 may comprise a hook, carabiner or feature and eye or opening respectively such that they can be releasably secured to each other. In an alternative embodiment, a linking member 45 (e.g., chain, rope, cable, rod, etc.) is secured to the members 40 and 44 at opposite ends so the inlet of the hose is slightly below the bottom of the float assembly. In yet another embodiment, the attachment member is rotatably secured to the bottom of the float 22. Also illustrated is that in one embodiment, the attachment member is centrally located on the bottom of the float. Of course, other locations are contemplated to be within the scope of exemplary embodiments of the present invention.

During a pumping operation, water moving into the strainer 42 or hose 50 may create a vortex (illustrated by the dashed lines 51 in FIG. 4, of course, the dimensions of the vortex may be smaller or larger than those illustrated as long as the inflated dimension of the float is greater than the largest dimension of the vortex) between the surface 14 of the water 10 and the inlet into the strainer 42 or hose 50. If such a vortex forms, air may be pulled into the hose 50 and ultimately damage the pump mechanism. By forming the float 22 with sufficiently large dimensions (as mentioned below) to ensure that the float device 20 and in particular the outer portions or periphery remains in constant contact with the water 10, generation of a vortex is prevented. The float 22 must also be sufficiently large such that the float device 20 remains buoyant once the hose 50 and strainer 42 are connected to the float attachment member 40. In an exemplary embodiment, the float 22 is generally cylindrical in shape and the attachment member 40 is centrally located so that the hose inlet is located centrally and below the float such that air will not be drawn into the hose via a vortex as the enlarged diameter of the float will prevent this. Of course, other shapes are contemplated.

The diameter of the top and bottom surfaces 23, 24 of the float 22 is wide relative to the distance between the top and bottom surfaces 23, 24. For example, the float may have a diameter in the range of approximately 18 to approximately 48 inches, and a height in the range of about 4 inches to about 12 inches. Accordingly, the inflated float will have a wide foot print with a low profile in order to cover a large surface area. Additionally, in embodiments where the float 22 includes a plurality of concentric internal chambers, the volume of the outer chamber 26 is larger than the other internal chambers, which ensures that the bottom surface 24 of the outer internal chamber 26 will remain in contact with the water 10. This will ensure that the bottom surface of the outermost chamber remains in contact with the surface of the water in order to prevent the formation of a vortex funnel. In an embodiment where the float 22 includes a plurality of internal chambers, the volume of the outer chamber 26 may be approximately 1.2 to 1.5 times the volume of any of the other internal chambers. This difference in volume ensures that the bottom surface of the outermost chamber remains in contact with the surface of the water in order to prevent the formation of a vortex funnel. In other words, by having a larger outer chamber volume in combination with inflated inner chambers, the weight of the hose being secured to attachment feature 40 will not cause the float to fold or crumple upon itself in a manner that would allow a vortex to be formed such that air would be drawn into the hose. In one embodiment, this larger volume is provided by having the outer wall of the outer chamber sufficiently spaced from the wall separating the outer chamber and the inner chambers. Still further, this larger volume may be achieved by configuring the outer chamber to have a larger height and width than any of the other inner chambers. Alternatively, only the height of the outer chamber is higher. Of course, the aforementioned ranges and configurations are provided as examples and the numerous embodiments of the present invention are not intended to be so limited unless specifically claimed.

In yet another alternative, the outer chamber 26 may have a height and width greater than the inner chambers 28 and 30 and chamber 28 may have a height greater than that of chamber 30. In yet another configuration chamber 30 may have a width greater than chamber 28.

In yet another configuration, the chambers 26, 28 and 30 are slightly spaced from each other and are surrounded by outer layer 29. In this embodiment, fluid coupling is provided via one way valves 27 which may or may not include a portion of a conduit between respective chambers. Alternatively and as mentioned above, each of the chambers may be fluidly isolated from each other and have their own respective inflation system platform 25 that may include any combination of the aforementioned valves.

Still further and in yet another alternative embodiment, the outermost chamber may be configured to be the only chamber that make direct contact with the surface of the water in order to prevent the vortex from drawing air into the hose. In another configuration, the outer chamber is higher and wider than the inner chamber or chambers in order to prevent the vortex and the chambers are surrounded by the outer skin 29. Alternatively, no outer skin employed.

FIGS. 6-8 illustrate an alternative configuration of float 20. Here the float has a square or rectangular configuration. Once again, the float may have several internal chambers either fluidly coupled to each other or each provided with their own means for inflation and deflation. Here, contemplated dimensions may range from 18 to 48 inches in width and 4-12 inches in height when in the inflated state also to ensure that the bottom surface of the outermost chamber remains in contact with the surface of the water in order to prevent the formation of a vortex funnel Of course, the aforementioned ranges are provided as examples and the numerous embodiments of the present invention are not intended to be so limited unless specifically claimed. Also, illustrated here is that the float has a pair of securement features or attachment members 40. It is of course, understood that the float may have numerous configurations as long as the foot print or profile of the float is sufficiently large enough to prevent a vortex from occurring due to the water being drawn into the inlet of the hose secured beneath the float.

In any of the aforementioned embodiments, the float may have an un-inflated or deflated configuration of less than 14 inches in width and less than 6 inches in height. Of course, the aforementioned ranges are provided as examples and the numerous embodiments of the present invention are not intended to be so limited unless specifically claimed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A float assembly for supporting an inlet end of a hose in a body of water, comprising:
   a float configured to transform between a un-inflated configuration, wherein the float has a first dimension and an inflated configuration, wherein the float has a second dimension, the second dimension being greater than the first dimension;
   a plurality of internal chambers located within an outer surface layer of the float each of the plurality of internal chambers being fluidly coupled to each other and wherein the plurality of internal chambers include an inner chamber, a middle chamber, and an outer chamber, wherein the outer chamber surrounds the middle chamber and the middle chamber surrounds the outer chamber;
   a mechanism for quickly inflating the float into the inflated state, wherein the mechanism is configured to fluidly couple a source of compressed gas to the plurality of internal chambers;
   a manual inflation valve accessible from an exterior of the float and being configured to provide a fluid passageway to the plurality of internal chambers; and
   an attachment member secured to the outer surface layer of the float, wherein the inflated configuration to prevents a vortex from drawing air into the inlet end of the hose when it is supported below a bottom surface of the outer surface layer of the float when the float is floating in the body of water.

2. The float device according to claim 1 wherein the float is made of flexible, lightweight, buoyant material.

3. The float device according to claim 2 wherein the float is made from vinyl.

4. The float device according to claim 1 further comprising:
   a deflation valve configured to allow fluid to be released from the plurality of internal chambers.

5. The float assembly according to claim 1, wherein the source of compressed gas is carbon dioxide.

6. The float device according to claim 1 further comprising an over pressure valve for releasing a portion of the gas within the plurality of internal chambers of the float wherein a pressure in at least one of the plurality of internal chambers exceeds a predetermined value.

7. The float device according to claim 4 wherein the manual inflation valve is also the deflation valve and the manual inflation valve is a type used in tire applications.

8. The float device according to claim 1 wherein the float is generally cylindrical in shape and has a planar configuration when it is in the inflated configuration.

9. The float device according to claim 8 wherein the float has a diameter in the range of approximately 18-48 inches and a height in the range of approximately 4-12 inches, when it is in the inflated configuration.

10. The float assembly according to claim 1 wherein the outer chamber has a volume approximately in the range of 1.2 to 1.5 times that of either the inner chamber or the middle chamber.

11. A system for pumping water from a body of water, the system comprising:
   a float assembly comprising:
   a float configured to transform between a un-inflated configuration, wherein the float has a first dimension and an inflated configuration, wherein the float has a second dimension, the second dimension being greater than the first dimension;
   a plurality of internal chambers located within an outer surface layer of the float each of the plurality of internal chambers being fluidly coupled to each other and wherein the plurality of internal chambers include an inner chamber, a middle chamber, and an outer chamber, wherein the outer chamber surrounds the middle chamber and the middle chamber surrounds the outer chamber;
   a mechanism for quickly inflating the float into the inflated state, wherein the mechanism is configured to fluidly couple a source of compressed gas to the plurality of internal chambers;
   a manual inflation valve accessible from an exterior of the float and being configured to provide a fluid passageway to the plurality of internal chambers; and
   an attachment member secured to the outer surface layer of the float, wherein the inflated configuration prevents a vortex from drawing air into the inlet end of the hose when it is supported below a bottom surface of the outer surface layer of the float when the float is floating in the body of water;
   a hose attachment member fixed to a first end of a hose and configured to be releasably secured to the float attachment member such that the float device supports the first end of the hose; and
   a water pump fluidly connected to a second end of the hose, the water pump being configured to pump water drawn from the first end of the hose when it is located in the body of water.

12. The system for pumping water according to claim 11, further comprising a strainer covering the first end of the hose.

13. The system for pumping water according to claim 11, wherein the hose attachment member and the float attachment member are a hook and eye respectively and wherein the float has a planar shape when it is in the inflated configuration.

14. The system for pumping water according to claim 11, further comprising an adapter for fluidly coupling the manual inflation valve to a SCBA bottle.

15. The system as in claim 11, further comprising an over pressure valve for releasing a portion of the gas within at least one plurality of internal chambers of the float when a pressure in the at least one of the plurality of internal chambers of the float exceeds a predetermined value.

16. The system as in claim 15, wherein the float is generally cylindrical in shape and wherein the float has a diameter in the range of approximately 18-48 inches and a height in the range of approximately 4-12 inches, when it is in the inflated configuration.

17. The system as in claim 16, wherein a height of the outer chamber is greater than a height of the inner chamber and a height of the middle chamber.

18. The system as in claim 17, wherein the outer chamber has a volume approximately in the range of 1.2 to 1.5 times that of either the inner chamber or the middle chamber.

19. A method for quickly inflating a float from an un-inflated state to an inflated state and locating an inlet end of a hose below a surface of a body of water and preventing a vortex from forming between the surface of the body of water and the inlet end of the hose, the method including:

releasing an amount of pressurized gas from a reservoir secured to the float by actuating a quick fill mechanism fluidly coupled to the reservoir and a plurality of internal chambers of the float, wherein the amount of pressurized gas inflates the plurality of internal chambers to inflate the float from the un-inflated state to the inflated state, wherein the un-inflated state has a first dimension and the inflated state has a second dimension, the second dimension being greater than the first dimension and wherein the plurality of internal chambers are located within an outer surface layer of the float and each of the plurality of internal chambers being fluidly coupled to each other and wherein the plurality of internal chambers include an inner chamber, a middle chamber, and an outer chamber, wherein the outer chamber surrounds the middle chamber and the middle chamber surrounds the outer chamber;

locating the inflated float in the body of water; and attaching the inlet end of the hose to an attachment member of the float located below the surface of the body water, wherein the second dimension is greater than a dimension of the vortex, and wherein the float further comprises a manual inflation valve accessible from an exterior of the float and being configured to provide a fluid passageway to the plurality of internal chambers.

20. The float device as in claim 1, wherein the float has a planar shape when it is in the inflated configuration.

* * * * *